H. B. RAND.
HEADLIGHT AND REFLECTOR.
APPLICATION FILED DEC. 29, 1915.
1,181,544.
Patented May 2, 1916.
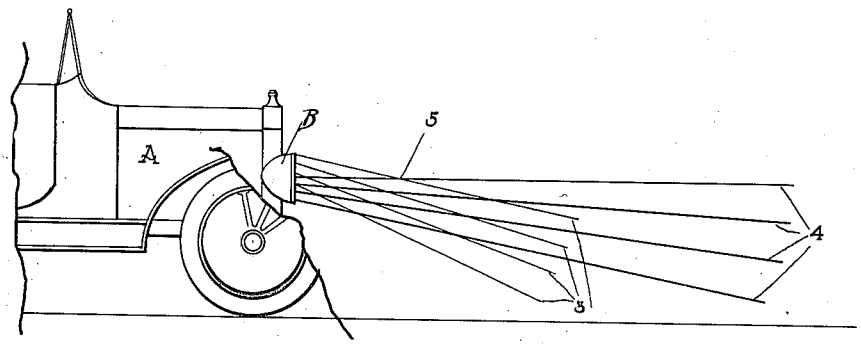
Fig. 1.
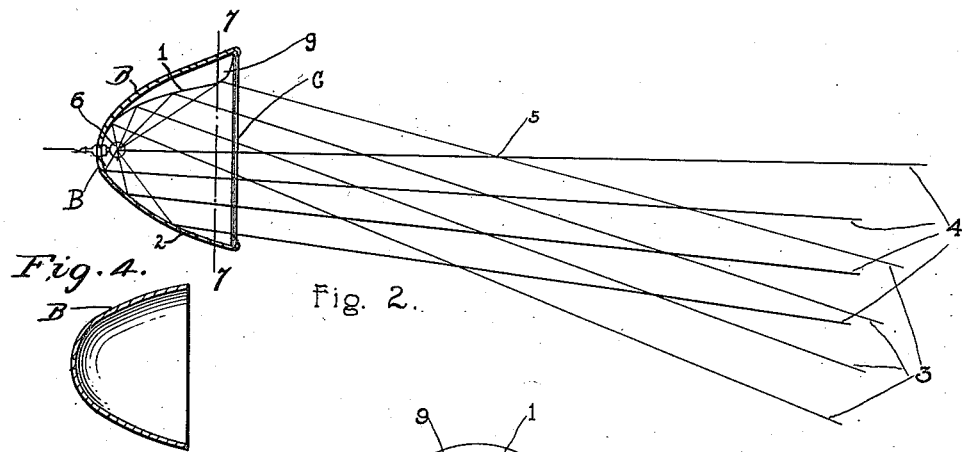
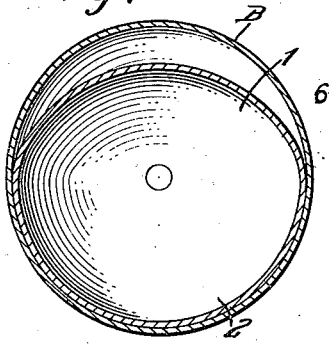
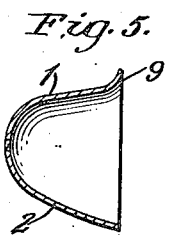
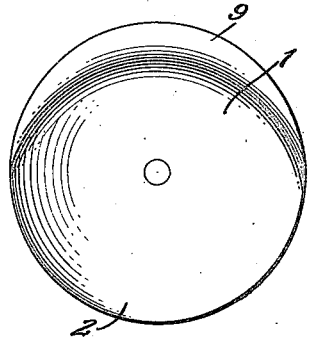
WITNESSES:
Maud E. Smith
Lina V. Fassett
INVENTOR.
Howard B. Rand

UNITED STATES PATENT OFFICE.

HOWARD B. RAND, OF MERRIMAC, MASSACHUSETTS.

HEADLIGHT AND REFLECTOR.

1,181,544.　　　　　Specification of Letters Patent.　　Patented May 2, 1916.

Application filed December 29, 1915. Serial No. 69,215.

*To all whom it may concern:*

Be it known that I, HOWARD B. RAND, a citizen of the United States, residing at Merrimac, in the county of Essex and State of Massachusetts, have invented a new and useful Improvement in Headlights and Reflectors, of which the following is a specification.

The object of the present invention is to provide a headlight, such for instance as an automobile headlight, having a paraboloid reflector so constructed and arranged that no ray of light reflected therefrom shall be projected in an upward direction, and so that the highest horizontal ray of light shall be in the horizontal plane of the source thereof. Thus, when the invention is applied to an automobile, the diffusion of light is so restricted that the eyes of pedestrians and of persons in vehicles within range of the headlights will not be subjected to blinding glare from the light, because of the absence of upwardly projected rays, but sufficiently powerful reflection will be afforded to meet every reasonable requirement. In attaining this object of the invention I form the upper and lower portions of the reflector so that their internal surfaces define portions of intersecting parabolas, each having a separate axis but both having a common focus. The axis of the upper internal surface is inclined downward, and the axis of the lower internal surface is horizontal. A reflector thus formed will not present a circular edge, and I therefore provide the upper half with a curved flaring margin so that a circular edge may be obtained that will contact snugly with the internal wall of the casings now used for the ordinary parabolic reflectors.

Of the accompanying drawings, which illustrate one form in which the present invention may be embodied: Figure 1 is a side elevation of an automobile equipped with a headlight embodying my invention. Fig. 2 is a vertical section, on an enlarged scale, through the headlight shown in Fig. 1. Fig. 3 is a front view of the headlight. Fig. 4 is a longitudinal vertical section of the case, the reflector and light being removed; Fig. 5 is a longitudinal vertical section of the reflector; Fig. 6 is an end view of the reflector looking toward its outer end; Fig. 7 is a transverse section on the plane of line 7—7 of Fig. 2.

The same reference characters indicate the same parts wherever they occur.

Referring now to the drawings,—a conventional form of automobile is indicated at A.

B is the casing of a headlight as usually constructed.

C is the lens.

The upper half of the reflector is indicated at 1, the internal surface of such half defining a portion of a parabola of which the focus point is at the light 6, the axis of the portion being inclined downwardly. The lower half of the reflector is indicated at 2, the internal surface of said lower half defining a portion of a parabola with its focus point at light 6 but with its axis horizontal when the headlight is in the position corresponding to the normal position of automobile headlights. The general direction of the rays of light reflected from the upper surface of the reflector is indicated by lines 3, and that of the rays from the lower surface is indicated by lines 4. The rays from the upper and lower surfaces of the reflector intersect as indicated at 5. The front portion of the upper part of the reflector is flared as at 9, to allow it to be used in a headlight casing having a circular opening. Dotted line 7—8 indicates the marginal portion of the upper reflecting surface, and begins and ends where the upper and lower reflecting surfaces merge. It will be seen that the reflector provided with the paraboloidal upper half or portion 1, and the paraboloidal lower half or portion 2, is confined in a predetermined position in the fixed case B, which has a horizontal axis, with the axis of the upper portion inclined downwardly and the axis of the lower portion substantially horizontal, so that the installation of the reflector in the case causes it to reflect light as above described.

It will also be seen by reference to Figs. 5, 6, and 7, that the outer portion of the reflector has a substantially elliptical cross section, the major axis of which is horizontal, and that the crescent-shaped flange 9 at the outer end of the upper portion 1 forms, with the outer end of the lower portion 2, a continuous circular rim entirely filling the circular mouth of the case B, so that there is no unsightly opening between the upper portions of the reflector and casing, and the reflector is firmly supported against rattling and against movement in the case in any radial direction, said flange also coöperating with the outer end of the lower portion 2 in forming a continuous seat for the marginal portion of the lens C.

The flange 9 also braces the upper portion of the reflector at its outer end and prevents liability of bending or distorting said portion by pressure exerted on the inner surface thereof in wiping and polishing the reflecting surface. The reflector is therefore adapted for use with a casing C of standard parabolic form without the liability of loose movement therein which would be due to the downward inclination of the axis of the upper portion 1, if the flange 9 were not provided.

From the foregoing description, taken in connection with the accompanying drawings, the construction of the reflector, the reason for the reflection of the light rays in the directions shown, and the manner of employing my invention, will be apparent. No light ray which proceeds from the reflector when the headlight is in its normal position will take an upward path,—the central rays being horizontal and all the other rays following an oblique path forward and down.

I do not confine myself to any one material for making the reflectors, as any material capable of taking the required formation and adapted to the purpose of a reflector may be used. It will be obvious, too, that the flange or flaring portion 9 could be made separately and fitted to the reflector if the material of which the reflector was made did not permit of its being made integral therewith.

I claim:

1. A reflector provided with paraboloidal upper and lower portions having a common focal point and axes diverging therefrom, the relative directions of said axes being such that when the reflector is fixed in its operative position the axis of the upper portion is inclined downwardly and the axis of the lower portion is substantially horizontal.

2. A reflector having a substantially elliptical cross section the major axis of which is substantially horizontal when the reflector is in its operative position, said reflector being provided with paraboloidal upper and lower portions having a common focal point, and axes diverging therefrom, the axis of the upper portion being inclined downwardly and the axis of the lower portion being substantially horizontal.

3. A reflector having a substantially elliptical cross section the major axis of which is substantially horizontal when the reflector is in its operative position, said reflector being provided with a paraboloidal upper portion having a downwardly inclined axis, and a paraboloidal lower portion the axis of which is substantially horizontal, said portions having a common focal point, and the upper portion being provided with a flange at its outer end forming, with the outer end of the lower portion, a rim adapted to bear on the circular mouth portion of a headlight case.

4. A head light comprising a case having a substantially horizontal axis, a reflector confined in a predetermined position by said case and provided with paraboloidal upper and lower portions having a common focal point and axes diverging therefrom, the axis of the upper portion being inclined downward relatively to the axis of the case, and the axis of the lower portion being substantially horizontal, and a source of illumination located at said focal point.

5. A headlight comprising a fixed case having a substantially horizontal axis, a reflector confined in said case and having a substantially elliptical cross section, the major axis of which is substantially horizontal, said reflector being provided with paraboloidal upper and lower portions having a common focal point and axes diverging therefrom, the axis of the upper portion being inclined downwardly and the axis of the lower portion being substantially horizontal, and a source of illumination located at said focal point.

6. A headlight comprising a fixed case having a substantially horizontal axis, a circular mouth, and a lens covering said mouth, a reflector confined in said case and having a substantially elliptical cross section, the major axis of which is substantially horizontal, said reflector being provided with a paraboloidal upper portion having a downwardly inclined axis, and a paraboloidal lower portion having a substantially horizontal axis, said portions having a common focal point, and the said upper portion being provided with a flange at its outer end, forming, with the outer end of the lower portion, a circular rim fitting the mouth portion, and a source of illumination located at said focal point.

In testimony whereof I affix my signature in the presence of two witnesses.

HOWARD B. RAND.

Witnesses:
 MAUD E. SMITH,
 LENA V. FASSETT.